United States Patent [19]
Galicia

[11] 3,907,684
[45]*Sept. 23, 1975

[54] ROTARY OIL RECOVERY DEVICE WITH NON-INTEGRAL COLLECTING HEAD

[76] Inventor: Frank Galicia, 5043 Catherine St., Philadelphia, Pa. 19143

[ * ] Notice: The portion of the term of this patent subsequent to May 30, 1989, has been disclaimed.

[22] Filed: Apr. 18, 1973

[21] Appl. No.: 352,208

[52] U.S. Cl. ............................ 210/242; 210/DIG. 21
[51] Int. Cl. ............................................. E02b 15/04
[58] Field of Search ...... 210/83, 242, DIG. 21, 521, 210/522

[56] References Cited
UNITED STATES PATENTS

| | | | |
|---|---|---|---|
| 2,536,729 | 1/1951 | Diaz-Compain | 210/522 |
| 3,615,017 | 10/1971 | Valdespino | 210/DIG. 21 |
| 3,637,080 | 1/1972 | Markel | 210/242 |
| 3,666,099 | 5/1972 | Gallicia | 210/242 |
| 3,667,610 | 6/1972 | Daniel | 210/DIG. 21 |
| 3,726,406 | 4/1973 | Damberger | 210/242 |
| 3,734,294 | 5/1973 | Zerbe | 210/DIG. 21 |

Primary Examiner—Theodore A. Granger
Attorney, Agent, or Firm—Woodcock, Washburn, Kurtz & Mackiewicz

[57] ABSTRACT

A recovery device for the removal of a less dense liquid from a more dense one which has particular application for the recovery of oil from bodies of water. The device floats and has a number of improved features over previous similar devices which contribute to improved flow characteristics of the contaminated liquid as it passes through the separation stages. A rotatable collecting head may be driven at a variable speed ratio to the remainder of the separation apparatus to regulate the intake of the contaminated liquid and streamlined construction of the separation apparatus is disclosed having an improved filtering means.

9 Claims, 4 Drawing Figures

ROTARY OIL RECOVERY DEVICE WITH NON-INTEGRAL COLLECTING HEAD

CROSS REFERENCE TO COPENDING APPLICATIONS

This application is related to applicant's copending applications Ser. No. 352,210 filed Apr. 18, 1973 entitled "Oil Collection Device" and Ser. No. 352,209 filed Apr. 18, 1973 entitled "Oil Separation and Recovery Device."

BACKGROUND OF THE INVENTION

The subject invention is designed to be used for collecting oil which may have accumulated on bodies of water as a result of oil spills, marine accidents, and various other causes. Mechanical oil recovery devices generally have a number of advantages over other types of oil removal processes such as chemical processes in that various pollution consequences are improved upon and the oil, once recovered, may then be processed for use.

The subject application discloses improvements over one of the embodiments disclosed in applicant's U.S. Pat. No. 3,666,099 which issued May 30, 1972. While that patent discloses a mechanical rotary oil recovery device which is of substantial utility, nevertheless, as disclosed in the subject application, a number of improvements have been made to produce a device capable of superior performance. The design of the collection head has been modified substantially to improve upon the performance of my earlier device in which the head was integral with the remainder of the separation apparatus, thereby requiring operation of the two at the same speed.

As in the design of the device disclosed in my aforementioned patent, inverted V-shaped troughs or channels, as improved, are used to assist in the separation of the liquids as the more buoyant liquid rises to the apex of the trough and pressure of following liquids forces the buoyant liquid downwardly into a separation drum.

In my aforementioned patent, debris which was washed through the ports could become a nuisance and lead to the clogging of the device. In the subject application, the fluid mechanics of the path of the contaminated liquid, namely water with a high concentration of oil present, is such that clogging becomes less of a factor. The use of screen filters further enhances performance.

The driving arrangement has been improved over that of my earlier device and in addition to permitting a variable speed ratio between the collecting head and the central separation drum, the driving means, such as a hydraulic motor, is positioned where it can be satisfactorily counterbalanced to reduce the tendency of the device to wobble which would impair performance.

SUMMARY OF THE INVENTION

Accordingly, it is an object of the subject invention to provide a floatable rotary recovery and separation device for removing a less dense liquid from a more dense one in which the flow characteristics of the liquids and the separation thereof are improved over prior devices of this nature.

It is a further object of the subject invention to provide a floatable rotary recovery and separation device in which the balancing of the device is improved over previous designs and wobbling is reduced.

It is another object of the subject invention to provide a rotary oil recovery device which has improved channeling and filtering of the contaminated liquid, the filtering being to remove all debris from the mixture of oil and water.

It is yet another object of the subject invention to provide a rotary oil collection and separation device which is designed so that the collection apparatus rotates at a variable speed ratio to the separation apparatus to better achieve optimum collection results in which the amount of liquid drawn into the collection apparatus is determined by that amount of liquid which can be processed by the separation device to produce optimum separation results, quantity of oil and viscosity of the oil being two of the factors which will affect the speed ratio.

It is a further object of the subject invention to provide an improved rotary oil recovery device in which the troughs or channels for guiding the contaminated water and for initially separating oil from water are of superior design to improve flow characteristics over earlier devices of this nature.

It is still another object of the subject invention to provide a collection head design which inhibits the escape or fanning out of contaminated water as it is being drawn inwardly to the central separation apparatus by the rotation of the collection head.

It is yet another object of the subject invention to provide an oil recovery device in which means are provided to better stabilize contaminated water and reduce turbulence as it is being drawn inwardly for separation.

In accordance with the above objects, the subject invention has been designed to improve performance standards of earlier rotary oil recovery devices, namely the type disclosed in my U.S. Pat. No. 3,666,099. The rotary oil recovery device is rotatably driven by a hydraulic motor and by means of a pair of gear train. The collection head can be rotated at a speed variable to that of the rotor member. The collection head, with its depending skirts for scooping the contaminated water and driving it inwardly to the separation apparatus, is driven by means of rollers powered by the motor. The rotor of the separation apparatus is journaled to a central shaft which is coaxial with the collection head and which is also rotatably driven by the motor. As water is fed inwardly from the collection head, it passes beneath, and into elongated spiraled inverted V-shaped troughs which are mounted to the upper portion of the rotor. As it comes under the troughs, the oil, because of its buoyancy, will rise to the apex of the trough where it is then forced downwardly, by the pressure of following water and oil, to a port where it enters the interior of the rotor. As the predominately oil substance passes upwardly within the rotor, it is filtered to remove debris and the oil which once again rises because of its buoyancy is fed to within the central shaft chamber member where it is pumped out. The relatively purified water enters an inner cylindrical chamber through an opening below where the oil enters the control shaft chamber and is expelled through the base of the inner cylindrical chamber into the surrounding water.

The structure of inverted V-shaped troughs is improved to better channel the flow of the contaminated liquid as it is forced to within the drum; and steam distributed adjacent the channels, and water from an external source injected into the channels, improve the flow of viscous oil as disclosed in alternate embodiments. The supporting cage also improves the flow of the contaminated liquid as it is designed to stabilize and reduce the turbulence of the water drawn inwardly by the collecting head as it passes to the troughs.

The accumulative effect of the modifications is to improve the flow characteristics of the contaminated substance as it is received by the collection head and channeled through the device as the separation occurs.

DETAILED DESCRIPTION

With reference to the drawings, a rotary oil recovery device is shown in which contaminated water is received by a collection head and channeled to a rotor during which time the contaminating fluid, namely oil, is separated in large measure from the water as the oil is forced downwardly via spiralled troughs through the liquid interface. Once in the rotor device, the contaminating fluid is further separated and drawn from the water which is then expelled to the surrounding body of water. The device floats and has its rotary drive means self-contained on the unit and is thus adapted to be left floating on an oil slick or the like. The oil recovered from the unit may be pumped to a transfer tank and then reprocessed for use.

Figure 1:
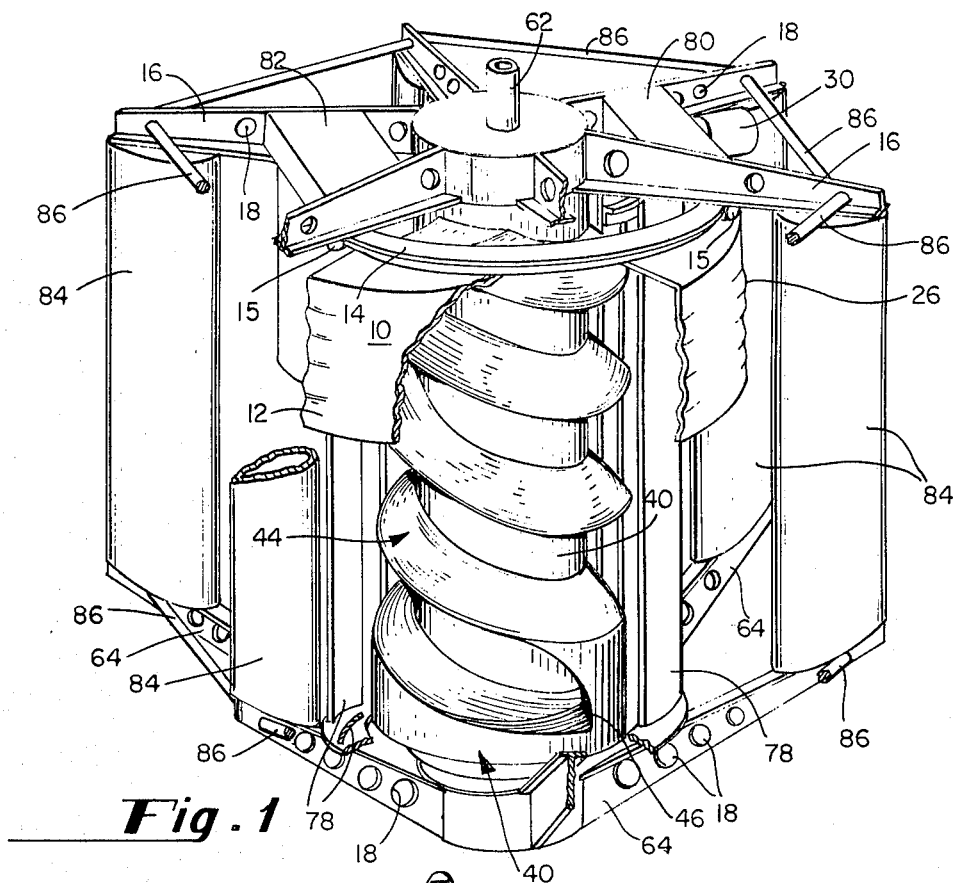
FIG. 1 is an isometric view of the improved rotary oil recovery device.
Figure 2:
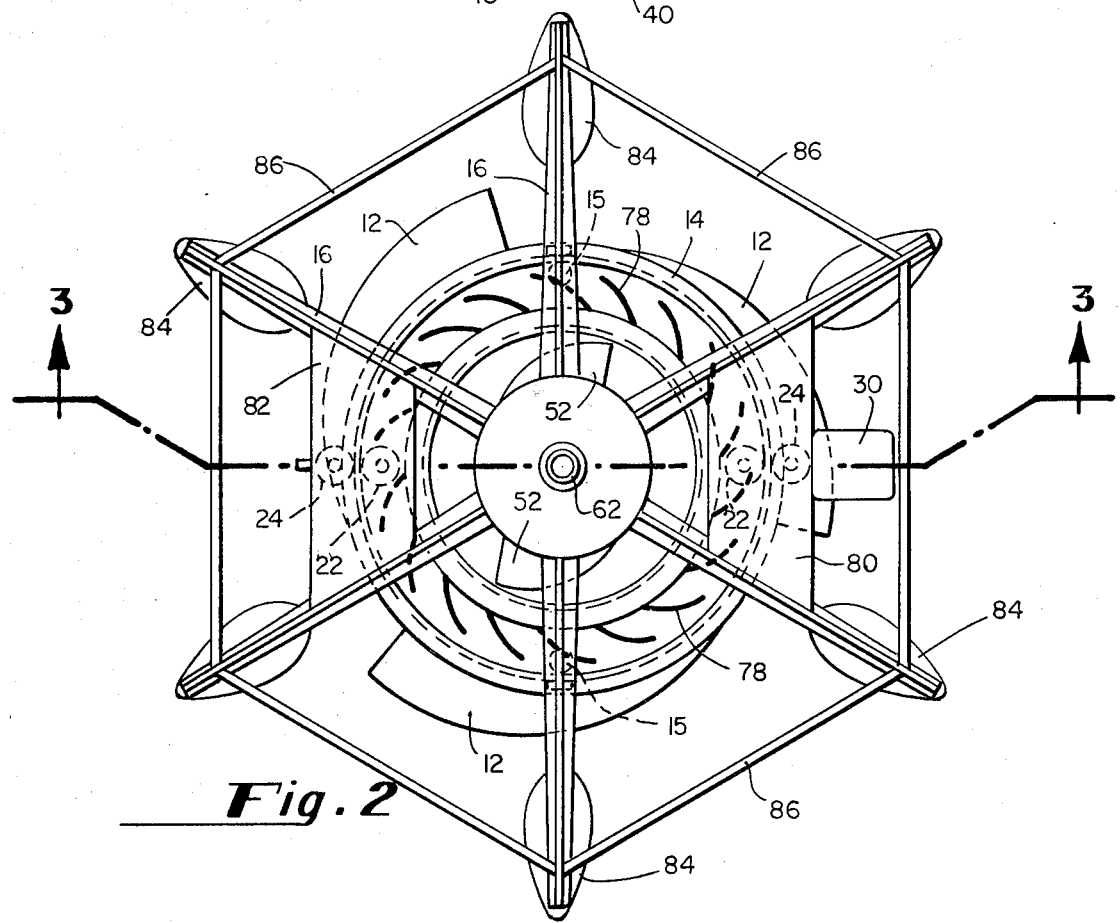
FIG. 2 is a top view of the rotary device of FIG. 1.
Figure 3:
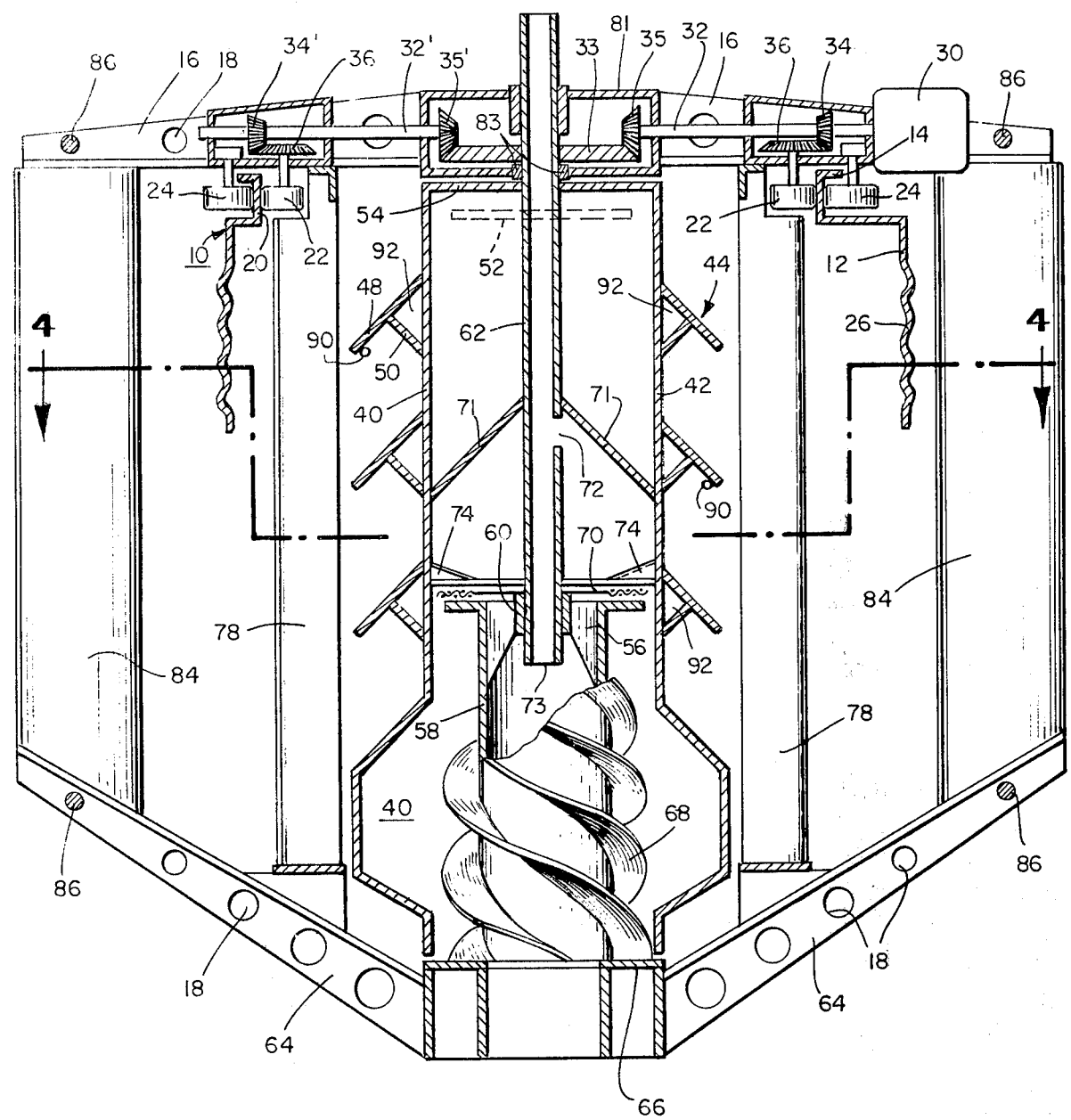
FIG. 3 is a cross-sectional elevational view of the rotary device of FIG. 1 taken along lines 3—3 of FIG. 2.

As can best be seen from FIGS. 1–3, the collection head generally referred to as 10 comprises three receiving scoops each of which have skirts 12 depending from the top frame portion 14 of the head. The head frame 14 rides on rollers 15 which may depend from at least two of the spoke frames 16. The skirts 12 depend from the head frame 14 by means of an integral flanged annular supporting arm 20 and the frame and integral skirts are driven by friction rollers 22 as subsequently will be described. The head 10 is coaxially confined in its rotation by rollers 24 which bear against its outside surface opposite the rollers 22. Apertures 18 in the spoke frames help to lessen the weight of the devices and, particularly in the case of the apertures in the lower frame members, aid in the balancing of the device to prevent it from being unduly influenced by waves and currents.

As shown in FIG. 2, three skirts are utilized, however, this number may be variable. As seen in FIGS. 1 and 3, the skirts 12 have corrugations or striations 26 which run parallel with the base and top of the skirts, the purpose of which will be described subsequently.

The collection head 10 and the rotor 40 (to be discussed) are driven by means of hydraulic motor 30 which is conveniently housed to one side of the device as seen in FIGS. 2 and 3. The weight of this motor can be easily counterbalanced by the distribution of weight on the opposite side as can be visually appreciated from FIG. 2. Extending from the motor 30 is splined drive shaft 32 which provides the drive for both the collection head 10 and the rotor 40. With particular reference to FIG. 3, the drive shaft 32 drives beveled gear 34 while the extension of the drive shaft 32' drives the beveled gear 34' on the opposite side of the device. The beveled gears 34 and 34' drive horizontal beveled gears 36, the force of which is transmitted to treaded friction drive wheels 22 which drive the annular supporting arm 20 of the collection head 10.

The rotor shown generally as 40 comprises a drum 42 which is rotatably driven by shaft 62 receiving its power from central horizontal bevel gear 33. The drive shaft 32 drives bevel gear 33 through bevel gear 35 and the power for driving shaft 32' is transfered from gear 33 to bevel gear 35'. Drum 42 has rigidly attached to its outside surface, two elongated inverted V-shaped troughs 44 which originate from diametrically opposite sides of the drum slightly below the top thereof and are spiralled downwardly around drum 42 terminating in ports 46 near the drum base as seen in FIG. 1. Each of the troughs 44 are formed by two bands. Wide outer band 48 extends angularly downwardly from the wall of drum 42 while narrow inner band 50 extends angularly upwardly from the drum wall and intersects at its upper edge, the approximate middle of band 48. Each inner band 50 terminates at its respective port 46 (see FIG. 1) in a foil, its lower end tapering to a point and curving upwardly to form a juncture with outer band 48 and drum 42 as the drum extends outwardly to accommodate the ports 46. Plates or baffles 52 (FIGS. 2 and 3) extend outwardly from drum 42 near its top closed head 54 and intersect the troughs 44 at their upper ends.

Within rotor 40, a hollow cylinder 58 is disposed which provides a radial bearing 60 for the lower end of the central shaft 62 by means of a series of plate-like supports 56. These supports 56 are vertical thin radial members which while they provide support, do not impede the flow of liquid downwardly into the cylinder 58. The cylinder 58 is secured within the lower frame members 64 by a flanged base 66 from which emanate radial fins 68 which spiral in the rotative direction of rotor 40 although the cylinder 58 and fins 68 do not themselves rotate. A filter screen 70 extends circumferentially from radial bearing 60 outwardly to almost the edge of drum 42.

A shaft port 72 in central shaft 62 is positioned to receive the more buoyant oil as it is forced upwardly as will be described. Also extending from shaft 62 to drum 42 is an inverted funnel 71 placed above shaft port 72, which seals off the drum interior above. Radial braces 74 extend inwardly from drum 42 and are rigidly connected to the shaft 62 thus serving to brace the structure. A cap 73 seals the bottom of the shaft 62.

As best seen in FIGS. 2 and 3, stabilizing vanes 78 which are partially curved are disposed from lower frame members 64 to top frame members 16. Also, as seen in FIG. 1, top frame casings 80 and 82 are disposed between the spoke frames 16 to support and protect the drive system. Central casing 81 houses the central drive system, and a segment of central shaft 62 part of which is supported within bearings 83.

Figure 4:
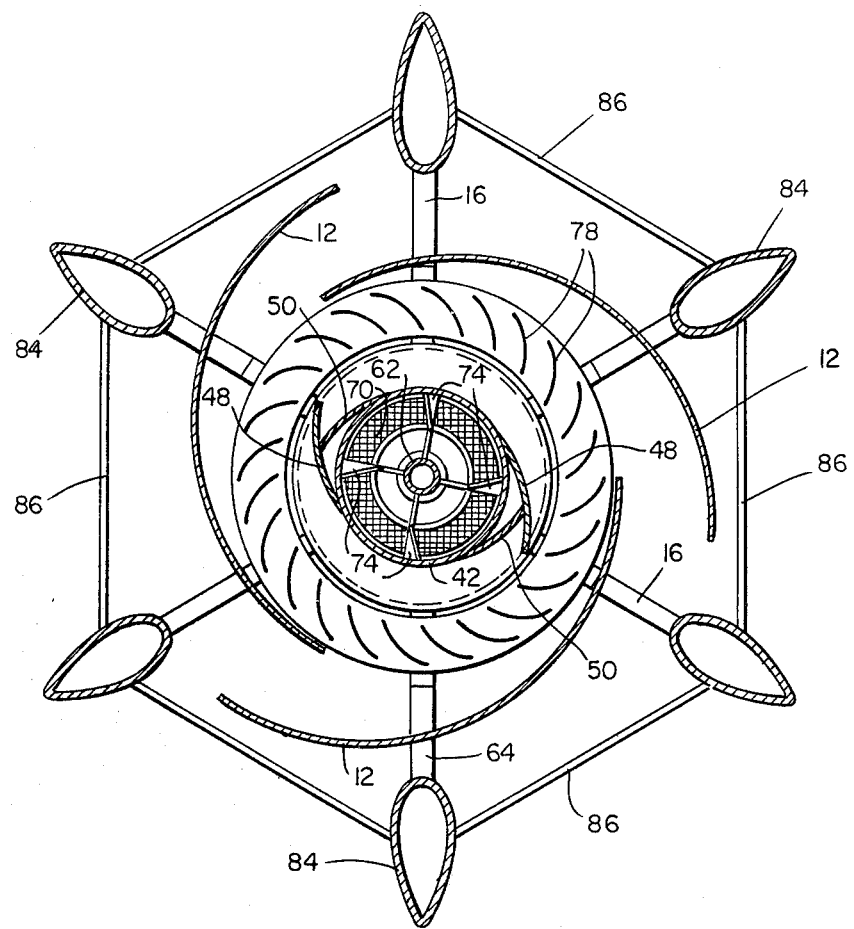
FIG. 4 is a top sectional view of the device of FIG. 1 taken along lines 4—4 of FIG. 3.

Depending from the outer extremity of the spoke frame members 16, buoyancy tanks 84 extend downwardly to lower frame members 64. As can be seen from FIGS. 2 and 4, the lower frame members 64 and the upper frame members 16 are further supported by peripheral frame members 86 which join the frame members at the top and base of buoyancy tanks 84.

Positioned along the troughs 44 at intervals are jets 90 which receive water from a supply source (not shown) and eject it counter-rotatively toward the vertex of the troughs 44. Also the closed triangular channels 92 which are formed between troughs 44 and drum 42 may be connected to a steam source (not shown). Both the water from jets 90 and the steam from channels 92 are used to expedite the flow of viscous oil downwardly while in troughs 44.

In operation, as the hydraulic motor 30 drives shaft 32, the rotary motion of the collection head 10 and the rotor 40 occurs which can be maintained at variable speed to one another for optimum intake. As the collection head 10 rotates, contaminated water is forced inwardly toward the rotor 40 with the corrugations 26 on the skirts 12 serving to inhibit the fanning out of water below the skirts 12 as it is drawn inwardly. It will be noted that the upper part of vanes 78 serve to stabilize water drawn inwardly by the collecting head 10, as well as to prevent debris from being drawn into the troughs 44 and rotor interior.

As the mixture of oil and water comes into the influence of the rotor 40, and the troughs 44, the oil, the more buoyant liquid, will rise to within the apex of the troughs 44 and the pressure of following fluid which is swept inwardly by the collection head 10 will force the oil downwardly through the oil water interface and into entry ports 46. The wide angles of the troughs 44 which are formed by the lower inner section of the outer band 48 and inner band 50 eliminate the possibility of debris wedging within the trough angle, that is the vertex of the inverted V. Water from jets 90, if used, serves to expedite the passage of heavy viscous oil and steam in channels 92, if used, aids in heating the oil to make it more fluid.

As contaminated water enters the ports 46, the spiralled fins 68 induce it to flow upwardly and the oil which rises to the top floats up through screen 70 which filters out any debris. The oil then flows up to the inverted funnel 71 and into port 72 in shaft 62 where a pump or other means draws it up through shaft 62 to a transfer tank (not shown) which will likely be on a craft accompanying the recovery device. The water which is being separated from the oil will rise as high as the top of cylinder 58 where it will enter cylinder 58 and be expelled through the base of the cylinder into the surrounding water.

An important aspect of the invention concerns the feeding of intake amounts of contaminated water with its usually heavy concentration of oil to the elongated spiralled troughs 44. The recovery device will operate at peak efficiency when the intake is sufficient to supply a continuing flow of liquid with the pressure of following liquid being sufficient to assist in forcing the liquid in the troughs 44 downwardly through the oil-water interface and into ports 46. If there is too great an intake, amounts of oil can be expected to escape and therefore it is important to control the intake flow. This is accomplished by the variable speed feature of the collection head 10 and by using gears of different sizes the speed may be adjusted before each operation with consideration being given to viscosity and amount of oil and the sea conditions.

By operating the unit in reverse, water flows up through the cylinder 58 into drum 42 and out through ports 46, thus flushing the unit free of any debris which may have accumulated beneath screen 70.

While various embodiments of the invention have been shown and described, it will be understood that various modifications may be made. The appended claims are therefore intended to define the true scope of the invention.

I claim:

1. A device for separating two liquids of different densities forming a liquid interface, including:
    a rotatable cylindrical member disposed within said device,
    an inverted trough supported by and disposed in a spiral fashion around the perimeter of said cylindrical member,
    a separation chamber disposed within said rotatable cylindrical member, said separation chamber communicating with the base of said inverted trough to receive the less dense liquid, and
    rotatable liquid collection means spanning said liquid interface to direct said liquids into said trough, said liquid collection means rotatable at a variable speed relative to the speed of rotation of said rotatable cylindrical member.

2. The device of claim 1 wherein said collection means is rotated by means of a gear assembly independent of a gear assembly rotating said rotatable cylindrical member.

3. The device of claim 1 wherein sidewalls of said inverted trough intersect to form a vertex spaced away from the external surface of said rotatable cylindrical member.

4. The apparatus of claim 1 including means to heat the liquids within said inverted trough.

5. The device of claim 1 including means disposed in heat exchange relationship with said inverted trough for heating said liquid flowing in said trough.

6. The device of claim 1 wherein said inverted trough includes water ejection means disposed at spaced intervals at the periphery of said trough for ejecting water toward the vertex of said trough, said water ejection means communicating with spiral-shaped fluid conduit means supported by said trough.

7. The device of claim 1 wherein said separation chamber includes an inverted funnel-shaped member to receive the less dense liquid, and
    liquid conduit means cooperatively associated with said funnel-shaped member for removing said less dense liquid from said chamber.

8. The device of claim 7 wherein said separation chamber includes a stationary spiral member for directing said less dense liquid into said inverted funnel-shaped member.

9. The device of claim 7 wherein said separation chamber includes filtering means to prevent debris from passing to said liquid conduit means.

* * * * *